(12) United States Patent
Bellows et al.

(10) Patent No.: US 7,689,515 B2
(45) Date of Patent: Mar. 30, 2010

(54) POWER PLANT LIFE ASSESSMENT

(75) Inventors: James C. Bellows, Maitland, FL (US); Fred W. Shoemaker, Longwood, FL (US)

(73) Assignee: Siemens Energy, Inc., Orlando, FL (US)

(*) Notice: Subject to any disclaimer, the term of this patent is extended or adjusted under 35 U.S.C. 154(b) by 870 days.

(21) Appl. No.: 11/008,899

(22) Filed: Dec. 10, 2004

(65) Prior Publication Data

US 2006/0129413 A1 Jun. 15, 2006

(51) Int. Cl.
- G06Q 20/00 (2006.01)
- G01R 11/56 (2006.01)
- G01N 19/00 (2006.01)
- C06D 5/06 (2006.01)
- F02P 3/02 (2006.01)
- B63H 23/24 (2006.01)

(52) U.S. Cl. .......... 705/80; 705/412; 73/865.9; 60/205; 323/371; 363/178

(58) Field of Classification Search .......... 73/865; 364/184, 492; 705/80, 412
See application file for complete search history.

(56) References Cited

U.S. PATENT DOCUMENTS

| | | | |
|---|---|---|---|
| 4,733,361 A | 3/1988 | Krieser et al. | |
| 4,766,550 A | 8/1988 | Byers et al. | |
| 4,908,775 A | 3/1990 | Palusamy et al. | |
| 4,935,195 A | 6/1990 | Palusamy et al. | |
| 4,955,269 A | 9/1990 | Kendig et al. | |
| 5,027,268 A | 6/1991 | Sakurai et al. | |
| 5,311,562 A | 5/1994 | Palusamy et al. | |
| 5,353,628 A | 10/1994 | Bellows | |
| 5,608,845 A | 3/1997 | Ohtsuka et al. | |
| 5,817,958 A * | 10/1998 | Uchida et al. | 73/865.9 |
| 6,490,506 B1 * | 12/2002 | March | 700/286 |
| 6,581,045 B1 | 6/2003 | Watson | |
| 6,732,019 B2 | 5/2004 | Spool et al. | |
| 6,735,549 B2 | 5/2004 | Ridolfo | |

OTHER PUBLICATIONS

William G. Sullivan, James A. Bontadelli, Elin M. Wicks; Engineering Economy; 2000; Printice Hall; Eleventh Edition; p. 68, 243.*
William G. Sullivan, James A. Bontadelli, Elin M. Wicks; Engineering Economy; 2000; Printice Hall; Eleventh Edition; pp. 68, 243, 388-423.*
William G. Sullivan, James A Bontadelli, Elin M. Wicks; Engineering Economy; 2000; Prentice Hall; Eleventh Edition; p. 68, 243, 388-423.*

* cited by examiner

Primary Examiner—John W Hayes
Assistant Examiner—David J Clark

(57) ABSTRACT

A method of evaluating a power plant having a design life based on operating the plant within an allowable chemical exposure range includes accumulating a history of a chemical exposure of a steam generating portion of the power plant. The method also includes determining a remaining life of the plant based on the history of the chemical exposure and assuming continued operation of the plant within the allowable chemical exposure range. The method may also include evaluating an economic value of operating the plant based on the remaining life of the plant.

3 Claims, 2 Drawing Sheets

POWER PLANT LIFE ASSESSMENT

FIELD OF THE INVENTION

This invention relates generally to power plants, and more particularly, to a method for assessing a life expenditure of a power plant.

BACKGROUND OF THE INVENTION

In the past, electricity generating power plants were typically operated continuously with few starts and stops over the plant's operating life. More recently, the economic effect of deregulating of the power generation industry in the United States has been to require a larger portion of electrical generating power plants to be cycled off line during periods of low electrical demand and to be cycled back on line during periods of high demand. For example, a power plant may be operated for a peak power demand period of 8 to 16 hours each day, then shut down when the peak power demand period ends. As a result, power plants, such as gas fired combined cycle plants, are being designed for cyclic operation.

One important factor that influences a power plant's projected design life (which typically may be 30 years) is the chemistry associated with the working fluids of the power plant, such as impurities in the steam used to drive a steam turbine. Accordingly, chemical impurity requirements, comprising Normal and Action Levels, that set limits for chemical impurities have been developed to ensure that a power plant remains undamaged due to over exposure to such chemicals during the plant's design life. Despite the migration towards cyclic operation of power plants, the Action Levels defined for a power plant's design life are typically based on the science and experience of continuously operating power plants. However, it has proven difficult to meet predetermined Action Level guidelines for cyclically operating plants, especially during startup of the plant when chemical impurities may exceed specified Action Levels. Increasingly, the economic benefit of operating power plants in cyclic modes may override a concern to ensure the plant is only operated within Normal and allowed Action Levels to avoid damage. A degree of damage that may shorten the life of a plant may be acceptable if an economic benefit of generating electricity under conditions that may cause damage to the plant (such as exceeding specified action level for a certain period of time) offsets an economic loss corresponding to a shortened life of the plant and/or an increased maintenance requirement. For example, it may be economically feasible to corrode a steam turbine of a power plant with impure steam to generate comparatively high cost power during a period of high demand.

BRIEF DESCRIPTION OF THE DRAWINGS

These and other advantages of the invention will be more apparent from the following description in view of the drawings that show.

DETAILED DESCRIPTION OF THE INVENTION

Figure 1:
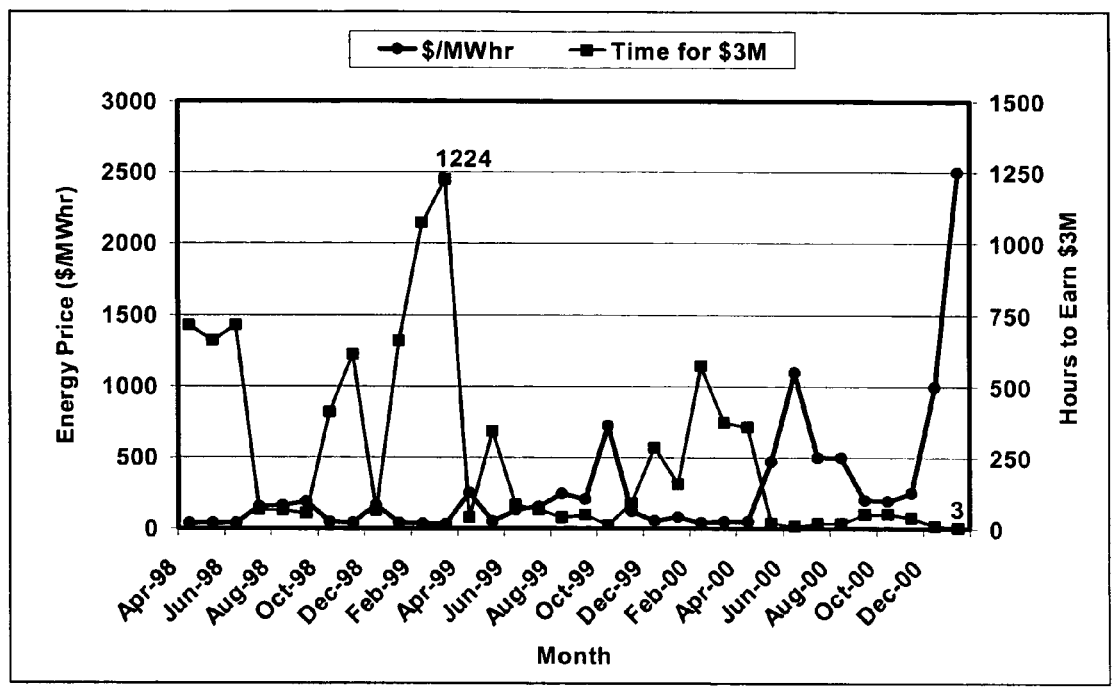
FIG. 1 is a graph showing energy prices and hours of energy production to earn $3 million dollars in the state of California versus time for a period extending from April 1988 to December 2000.

A power plant operator operating a power plant having an abnormal chemistry, such as a chemistry exceeding an Action Level for the chemistry, may need to decide whether the power plant should be allowed to continue operation with the abnormal chemistry (which might accelerate damage to the power plant and consequently, shorten the life of plant), or if the power plant should be shut down to avoid damage thereby forfeiting potential revenue for power generation. The graph depicted in FIG. 1 shows the price of power in the state of California and the time it would take to earn $3 million dollars with a $25 per Megawatt-hour marginal cost for a period extending from April 1988 to December 2000. As shown in the graph, there are times when the plant may lose money, such as when the marginal cost exceeds the revenue for the power that would be generated, and therefore should not produce power. However, there are times when the plant may earn $3 million in 3 hours. Consequently, it may be economically feasible to generate $3 million dollars for three hours running with, for example, a sodium hydroxide chemistry exceeding allowable levels in the steam despite some damage occurring to the power plant. A cost of the damage to the plant or an economic loss as a result of a shortened life span of the plant may be less then an economic gain of three million dollars. However, conventional chemistry monitoring systems do not provide the information needed to make plant operating decisions based on economic factors when potentially operating the plant with abnormal chemistries. Consequently, information to allow a power plant operator to make economic judgments regarding operation of a power plant with chemistries that may exceed specified Action Levels is needed. To provide plant operators with information needed to make such economic decisions, the inventors have developed an innovative method to monitor a chemical exposure of a power plant to estimate remaining life of the power plant. Generally, the method uses conventional Normal and Action Level recommendations to generate an allowable exposure over a design life of the plant, then integrates the chemical exposure of the power plant and estimates a remaining life of the plant based on future operation of the plant within recommended action levels.

Figure 2:
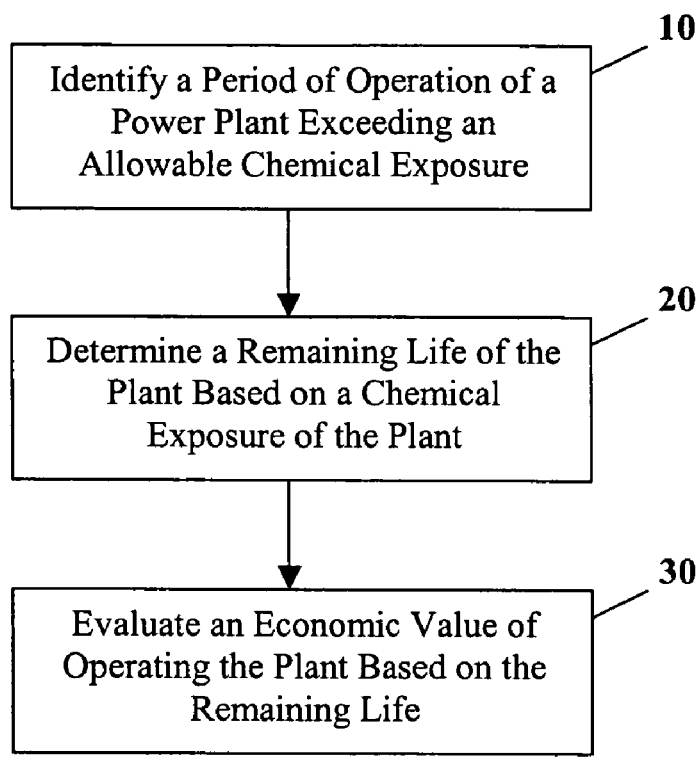
FIG. 2 is flow chart depicting steps in a method for assessing a power plant with a chemical exposure exceeding an allowable chemical exposure range.

As shown in the flow diagram of FIG. 2, a method for evaluating a power plant having a design life based on operating the plant within an allowable chemical exposure range may include identifying a period of operation of the plant exceeding an allowable chemical exposure range of a power plant 10. For example, the period of operation may be a historical period of operation of the plant and/or a projected future operation of the plant exceeding an allowable chemical exposure. Having identified such a period(s), a remaining life of the plant may be determined based on a chemical exposure of the plant 20 comprising at least a period of chemical exposure exceeding the allowable chemical exposure range and a continued operation of the plant within the allowable chemical exposure range. For example, step 20 may include determining an allowed chemical exposure of the power plant over the design life of the plant, accumulating historical chemical exposure values, and generating a design life allowance representing the historical chemical exposure of the plant and a remaining life allowance based a continued operation of the plant within the allowable chemical exposure range, from which a remaining life may be determined.

The method may further include using the determined remaining life of the plant to evaluate an economic value of operating the plant 30, for example, by comparing the remaining life of the plant with the design life. This step 30 may include comparing an economic gain achieved by operating the plant with a period of chemical exposure exceeding the allowable range with an economic loss resulting from the remaining life being shorter than the design life due to the chemical exposure exceeding the allowable range. For example, an eight hour period of operating the plant above an allowable chemical exposure level may reduce the life of the plant by one month. A cost/benefit analysis may be employed to weigh the cost associated with a loss of one month of plant life at the end of the plant's design life against the benefit of being able to generate revenue by selling power produced during the abnormal chemical exposure period of eight hours to allow a plant operator to make an informed decision regarding when and how long to operate the plant with abnormal chemistries. Such a cost benefit analysis may include factors such as a price of the power generated, a marginal cost of the power generated, depreciation of the plant during its design life, and a time value of money, such as an appreciated value of a current gain at the end of the design life of the plant.

In a combined cycle power plant embodiment, the innovative method allows an operator to keep track of the chemical damage to the power plant, such as a steam turbine portion of the plant. For example, corrosion to a steam turbine may be proportional to a concentration of salt present in the steam and the amount of time the concentration is present. Accordingly, a life expenditure of a power plant may include an amount of contamination, such as salt exposure, experienced by the power plant, measured, for example, in parts-per-billion (ppb)-days, divided by the total allowed contamination (measured in ppb-days) over the design life of the plant.

In another aspect of the invention, the method may be implemented by determining an allowed chemical exposure of the power plant over the design life of the plant. This allowed chemical exposure may be expressed in terms of an historical chemical exposure of the plant and a remaining allowed exposure. First, an allowable exposure may be expressed by formula (1) below:

$$A_t = \sum_{j}^{m} \sum_{i}^{d} a_j(d-i) \tag{1}$$

wherein $A_t$ (in units of concentration-years) is the total allowable exposure over the design life of the turbine, m is the number of Action Levels for a contaminant, j is an index for the number of action levels, $a_j$ is the annual allowed exposure in Action Level j in concentration (concentration*time/time), d is the design life in years, and i is an index for design years.

For example, a sodium concentration may have a normal limit of 5 ppb an Action Level 1 range from 5 ppb to 10 ppb for a maximum of 2000 hours per year. Thus $a_1$ may be expressed as (2):

$$a_1 = (10-5)(2000/8760)\text{ppb} = 1.14 \text{ ppb} \tag{2}$$

wherein the term (10–5) is the additional sodium exposure over a normal exposure for Action Level 1, and the term (2000/8760) is the fraction of a year permitted in Action Level 1. The units on $a_1$ may be considered to be ppb-year/year, which is the total exposure per year.

Similarly, the allowed exposure at each predetermined action level may be calculated using formula (1). By summing each $a_j$ together, a total allowable exposure over the design life of the turbine A may be calculated.

Historical chemical exposure values for the power plant may be accumulated, for example, using know power plant chemistry monitoring equipment, and calculated according to the formula (3):

$$e_i = \sum_t (v-l)\Delta t \tag{3}$$

wherein $e_i$ is the exposure in a given year i, v is the value, l is a normal limit for the contaminant being monitored (such as 5 ppb for sodium), $\Delta_t$ is the time interval that the value v is present, and t is the time period over which the value is monitored, such as a year.

Using the above formulas, an expression for the design life allowance partitioned between the historical exposure of the plant and a remaining life allowance for a time period extending from the historical exposure to the end of the life may be generated as shown in formula (4) below:

$$A_t = \sum_{i=1}^{h} e_i(n-i) + \sum_{j=1}^{m} \sum_{i=h}^{n} a_j(n-i) \tag{4}$$

wherein h represents the number of years for which historical data was gathered, the first summation term represents the historical exposure for h years and the second term represents the remaining chemical exposure allowance for the design life from year h and assumes plant operation within normal operating levels and within the various action levels for the allowed times for the remaining time period.

Equation (4) may then be solved for n, such as by using known iterative techniques, by substituting A from equation 1 for $A_a$ in equation 4. Accordingly n, which may be fractional, represents the remaining life of the plant in years. Therefore, the turbine should be inspected before n years expire.

A similar calculation using the above equations may be performed for each corrosive component. Using this method, a plant operator can assess the real cost of operating with abnormal chemistry, such as the cost of a shortened design life. This innovative method allows a plant operator to make an informed decision to trade future life for current economic gain. As new monitoring requirements or techniques are developed, the method may be applied to the data gathered using the new requirements and techniques.

In yet another aspect, the method may be applied to monitoring of boilers and other plant equipment for which chemical exposure standards exist. For example, when corrosion damage is simply proportional to an exposure time, such as in the case of a boiler exposed to an acid, the equation for allowable exposure (1) may be reduced to (5):

$$A_t = n\sum_{j}^{m} a_j \tag{5}$$

and the remaining life $A_r$ becomes (6):

$$A_r = A_t - \sum_{i=1}^{h} e_i. \qquad (6)$$

It may also be desired to predict an economic cost of operating a plant with abnormal chemistry based on a historical exposure and projecting operating the plant with an abnormal chemistry into the future. A plant operator may want to assess a current economic effect of operating a plant with abnormal chemistry for a time period extending in the future to make a real time decision whether to continue operating the plant. For example, the plant operator may want to know the effect of operating a plant with abnormal chemistry for three more hours from a current time. This can be accomplished by partitioning the total life allowables into historical, current incident, and post current incident.

$$A_t = \sum_{i=1}^{h} e_i(n-i) + \sum_{i=h}^{c} e_i(n-i) + \sum_{j=1}^{m}\sum_{i=c}^{n} a_j(n-i) \qquad (7)$$

or $$A_r = A_t - \sum_{i=1}^{c} e_i + \sum_{i=c}^{h} e_i \qquad (8)$$

where the sum from h to c is the projected exposure over the current incident. In the cases of projecting the effect of current abnormal chemistry, it may be easier to conceive of the sums if one thinks that the units are hours or minutes, rather than fractional years.

Based on an economic trade-off between current economic gain and later economic loss, the plant operator may decide to continue operation of the plant with abnormal chemistry because the economic gain (earned by producing power) would be offset the economic loss. Alternatively, the plant operator may decide to shut down the plant because the economic loss, (for example, due to damage to the plant) may be greater than the economic gain. Accordingly, equations similar to those described above may be developed to project the economic effects of plant operation with abnormal chemistry in the future to allow a plant operator to make real time decisions about plant operation.

The above described methods may be implemented using known power plant chemistry monitoring equipment, such as by being incorporated into a digital control system (DCS) of a power plant While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

We claim as our invention:

1. A method of evaluating a power plant having a life based on operating the power plant within an allowable chemical exposure range, the method comprising:

identifying a projected future period of operation exceeding the allowable chemical exposure range of the power plant;

using power plant monitoring equipment, determining a remaining life of the power plant based on the period of operation exceeding the allowable chemical exposure range and assuming continued operation of the power plant within the allowable chemical exposure range;

comparing an economic gain achieved by operating the power plant with the projected future period of operation exceeding the allowable chemical exposure range with an economic loss resulting from the remaining life of the power plant being shorter than a design life of the power plant due to the projected future period of operation exceeding the allowable range using the power plant monitoring equipment; and after said comparing, intentionally continuing operation of the power plant for the projected future period of operation upon determining that the economic gain achieved by operating the power plant with the projected future period of operation exceeding the allowable chemical exposure range is greater than an economic loss resulting from the remaining life of the power plant being shorter than a design life of the power plant due to the projected future period of operation exceeding the allowable range;

wherein the comparing comprises using formula (I) to determine the allowable chemical exposure range:

$$A_t = \sum_{i=1}^{h} e_i(n-i) + \sum_{i=h}^{c} e_i(n-i) + \sum_{j=1}^{m}\sum_{i=c}^{n} a_j(n-i); \qquad (I)$$

and thereafter using the determined allowable chemical exposure range in formula (I) to determine the remaining life of the power plant:

$$A_r = A_t - \sum_{i=1}^{c} e_i + \sum_{i=c}^{h} e_i; \qquad (II)$$

wherein $A_t$ is a total allowable exposure over a design life,
wherein $A_r$ is a total remaining life of the power plant,
$e_i$ is an exposure for a given year i,
h represents a number of years for which historical data was gathered,
c is a time in years of an exposure to abnormal chemistry,
n is a remaining life of the power plant in years,
i is an index for design years,
m is a number of Action Levels for a contaminant,
j is an index for a number of Action Levels, and
$a_j$ is an annual allowed exposure in Action Level/in concentration.

2. The method of claim 1, wherein evaluating an economic value further comprises including a factor selected from the group consisting of depreciation and a time value of money.

3. The method of claim 1, wherein the power plant has a present current exposure exceeding the allowable range, and wherein the evaluating further comprises making a real time decision whether to continue to operate the power plant for the future period of operation exceeding the allowable chemical exposure range.

* * * * *